2,919,272
Patented Dec. 29, 1959

2,919,272

**SUBSTITUTED PHENOTHIAZINYL TRIFLUORO-
METHYL SULFONES**

Paul N. Craig, Roslyn, Pa., assignor to Smith, Kline & French Laboratories, Philadelphia, Pa., a corporation of Pennsylvania No Drawing. Original application April 16, 1958, Serial No. 728,773. Divided and this application March 31, 1959, Serial No. 803,090

2 Claims. (Cl. 260—243)

This invention relates to novel phenothiazinyl trifluoromethyl sulfones having utility as intermediates for the preparation of new 10-aminoalkylphenothiazinyl trifluoromethyl sulfones of value as therapeutic agents.

More specifically, the 10-substituted phenothiazinyl trifluoromethyl sulfones prepared from the novel intermediate compounds of this invention have utility as antiemetics, tranquilizers, calmatives, antihistamines, spasmolytics, antishock agents and potentiators of various central nervous system depressants, such as analgetics or anesthetics. Particularly important are the utilities of these compounds as antiemetics and tranquilizers. In addition, these compounds have chemotherapeutic or antimicrobial activity, such as antileprosy, antitubercular, antibacterial and fungicidal activity. For example, they possess unusual fungicidal or antibacterial activity, such as against *Diplococcus pneumoniae* Type I, *Hemolytic streptococcus*, *Micrococcus pyogenes* var. *aureus*, *Klebsiella pneumoniae* and *Candida albicans*.

The 10-substituted compounds prepared from the phenothiazinyl trifluoromethyl sulfone intermediates of this invention are represented by the general formula:

Formula 1

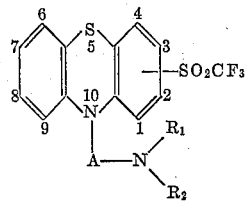

when:

A represents a divalent, straight or branched alkylene chain containing 2 to 6 carbon atoms, preferably 2 to 4 carbon atoms, separating the two nitrogens by at least 2 carbons; and $R_1$ and $R_2$ represent either hydrogen, alkyl or divalent groups which, together with the nitrogen to which they are attached, form a five to six-membered heterocyclic ring, such as pyrrolidinyl, piperidinyl, piperazinyl or substituted piperazinyl.

The term substituted piperazinyl is used herein to include moieties as represented by the following formula:

Formula 2

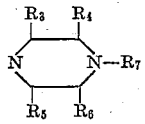

when:

$R_3$, $R_4$, $R_5$ and $R_6$ represent hydrogen, methyl or ethyl; and $R_7$ represents hydrogen, alkyl, acyloxyalkylene such as alkanoyloxyalkylene or monocyclic aroyloxy-alkylene such as benzoyloxyalkylene, hydroxyalkylene, dialkylaminoalkylene, hydroxy alkyleneoxyalkylene, monocyclic aralkyl of from 7 to 10 carbons such as cinnamyl and phenylalkyl, or acyl, such as alkanoyl, phenylalkanoyl, monocyclic aroyl, carbobenzoxy or lower N-substituted carbamyl such as dialkyl carbamyl.

The preferred substituted piperazinyl moieties are N-hydrogen piperazinyl, N-alkylpiperazinyl, N-(ω-hydroxyalkylene)-piperazinyl, N-(ω-alkanoyloxyalkylene)-piperazinyl, N-(ω-monocyclic aroyloxy-alkylene)-piperazinyl, N-monocyclic aralkylpiperazinyl, N-alkanoylpiperazinyl, N,2,3,5,6-pentamethylpiperazinyl or N-(ω-hydroxy-alkyleneoxy-alkylene)-piperazinyl.

The $SO_2CF_3$ group is preferably in the 2 position.

The preferred compounds prepared from the intermediates of this invention are represented by the following structural formula:

Formula 3

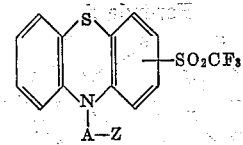

when:

A represents a divalent, straight or branched alkylene chain containing 2 to 4 carbon atoms, advantageously propylene, separating the nitrogen atoms by at least 2 carbons; and Z represents dimethylamino, piperazinyl or N-substituted piperazinyl, specifically alkyl, alkanoyloxy-alkylene, hydroxy-alkyleneoxy-alkylene or hydroxy-alkylene piperazinyl.

By the term alkyl or alkanoyl where used herein alone or in combination with other terms, aliphatic groups having not more than 6 carbon atoms and preferably not more than 4 carbon atoms are indicated except where otherwise specified. When the term alkylene is used in connection with a carbon chain, this term represents alpihatic groups of from 2 to 6 carbon atoms, preferably 2 to 4 carbons except where otherwise specified.

Also included with the above defined bases prepared from the intermediates of this invention are the salts formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicyclic, citric, gluconic, lactic, malic, mandelic, cinnamic, citraconi, aspartic, stearic, palmitic, itaconic, glycolic, pi-aminobenzoic, glutamic, benzene sulfonic and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The novel phenothiazinyl trifluoromethyl sulfones, which are unsubstituted in the 10-position, are used as intermediates to prepare the biologically active 10-aminoalkylphenothiazinyl trifluoromethyl sulfones described in Formula 1. While these unsubstituted phenothiazinyl trifluoromethyl sulfones have utility particularly as intermediates, as indicated, they have significant antifungal and antibacterial activity, such as against *Di-* plococcus pneumoniae Type I, Hemolytic streptococcus, Micrococcus pyogenes var. aureus, Klebsiella pneumoniae and Candida albicans and are also useful in eliminating such infections from animal colonies.

The novel phenothiazinyl trifluoromethyl sulfones are represented by the following formula:

Formula 4

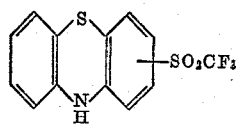

The $SO_2CF_3$ group is preferably in the 2-position.

The compounds of Formula 4 are prepared by cyclizing the sulfonyldiphenylsulfides represented by the following formula:

Formula 5

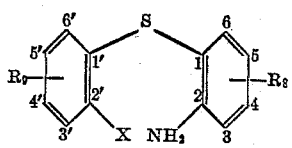

when:

$R_8$ and $R_9$ are different and selected from the group consisting of H and $-SO_2CF_3$, preferably in the 4 or 4' positions; and X represents chloro, bromo or iodo.

Preferably $R_9$ is hydrogen, $R_8$ is $-SO_2CF_3$ in the 4-position, and X is bromo or iodo.

The method is carried out by heating the sulfonyldiphenyl sulfides of Formula 5 in the presence of an acid-binding agent present in at least an amount sufficient to neutralize the hydrohalic acid formed during the reaction. Exemplary of such acid-binding agents are the carbonates, such as sodium carbonate, sodium bicarbonate or preferably potassium carbonate. The reaction is run in a suitable, non-reactive organic solvent in which the reactants are at least partially soluble. Exemplary are dioxane, dimethylaniline, diethylformamide, methylformamide, dimethylformamide or dimethylacetamide. Preferably, the solvent is dimethylformamide and other similar lower-carbon amides.

Optimum yields are obtained when catalytic amounts of copper or copper bronze powder are added, for instance up to 5% by weight of the diphenyl sulfide. The reaction mixture is advantageously heated at from about 100 to 220° C. for long periods, such as from 4 to 60 hours. Preferably, the reaction mixture is heated with stirring at the boiling point of the solvent for from about 8 to 24 hours. The reaction mixture is worked up by cooling, filtering and quenching in water. The separated product is washed, recrystallized and optionally sublimed to give the desired sulfonylphenothiazine, usually as yellow crystals.

This reaction may be advantageously run in an alternative manner, namely, by alkylating the 2-amino-2'-halo-X-sulfonyldiphenyl sulfide prior to the cyclization, thereby substituting the primary amine with a tertiary alkylaminoalkyl moiety which is not reactive under the cyclization conditions subsequently employed. This alkylation is carried out under conditions identical with those described hereafter for the 10-alkylation of the phenothiazinyl trifluoromethyl sulfones. The cyclization conditions of the alkylated amine are identical to those described above.

The sulfonyldiphenyl sulfides are prepared by methods analogous to those in the prior art, for instance as illustrated hereafter for the preparation of 2-trifluoromethylsulfonylphenothiazine:

METHOD A

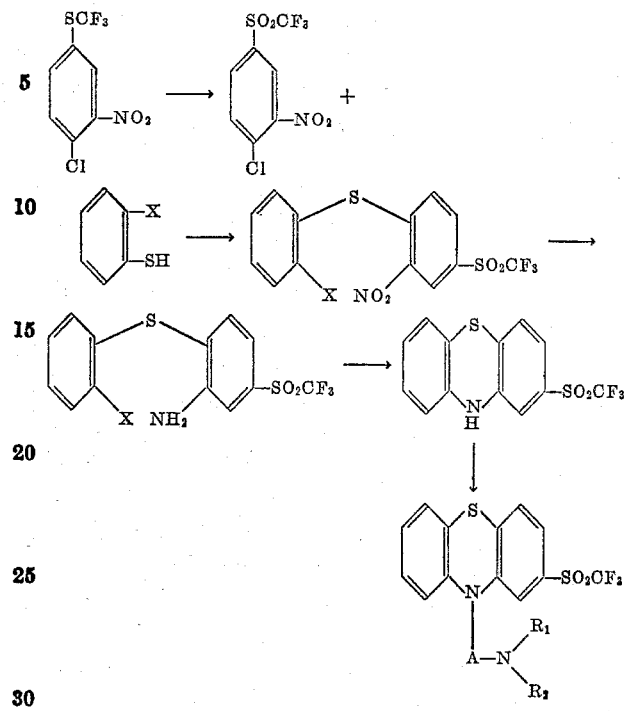

In Method A, 3-nitro-4-chlorophenyl trifluoromethyl sulfide is oxidized to the corresponding sulfone with chromic anhydride in sulfuric acid. The 3-nitro-4-chlorophenyl trifluoromethyl sulfone is condensed with o-bromothiophenol under alkaline conditions to give the diphenyl sulfide. The 2-nitro group is reduced with stannous chloride-hydrochloric acid to give 2'-bromo-2-amino-4-trifluoromethylsulfonyldiphenyl sulfide which is then further reacted as described above.

The selected phenothiazinyl trifluoromethyl sulfones of Formula 4 are condensed with a reactive tertiary aminoalkyl ester having the desired dialkylaminoalkyl group to form the desired 10-aminoalkylphenothiazinyl trifluoromethyl sulfone of Formula 1. Any reactive tertiary aminoalkyl ester containing the desired

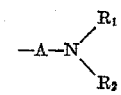

moiety may be used, such as the halides, preferably bromide or chloride, or the sulfonic esters, preferably p-toluene sulfonate. The reaction is preferably carried out at a temperature in the range of from about 30° C. to about 160° C. The condensation is carried out advantageously by refluxing the reactants in an inert aromatic solvent such as, preferably, benzene, toluene or xylene, in which at least one of the reactants must be soluble. A suitable acid-binding agent is usually included, such as an alkali metal amide, preferably sodium, potassium or lithium amide. Other acid-binding agents are alkali metal hydride, preferably sodium hydride or alkali metal aryl or alkyl compounds, preferably phenyl or octyl sodium. If the acid addition salt of the reactive ester is used, a corresponding increase in acid-binding agent must be used.

The preferred method of alkylation, however, is to react the trifluoromethylsulfonylphenothiazine nucleus with a dialkylaminoalkyl chloride or bromide with a slight excess of sodium or potassium amide in refluxing benzene or toluene for from 30 minutes to 36 hours, preferably 3 to 8 hours.

The preferred method of isolating the 10-aminoalkylphenothiazinyl trifluoromethyl sulfone is to quench the cooled reaction mixtures with an excess of water. The organic layers are extracted with dilute acid, preferably dilute hydrochloric acid. The acid extracts are combined, neutralized and extracted with benzene. The dried benzene extracts are evaporated to give the desired compound, usually as a solid.

The ω-piperazinylalkylphenothiazinyl trifluoromethyl sulfones are prepared advantageously by alkylating a trifluoromethylsulfonylphenothiazine (Formula 4) with an ω-haloalkylpiperazine with the free N-hydrogen of the piperazinyl moiety protected by, for example, a benzyl, carbobenzoxy, or acyl, preferably formyl group. The N-protective group is then removed, such as by mild hydrolysis. The resulting ω-piperazinyl alkylphenothiazinylsulfone may then be further alkylated to form various modifications of the compounds of Formula 1 with optional variations of the moieties of Formula 2. Such methods of alkylation are by a reactive ester such as an alkyl halide in the presence of an acid-binding agent in inert solution such as benzene or butanone, by reaction with an alkylene oxide such as ethylene oxide in alcohol or by reduction of a N-acyl compound such as reduction of the N-acyl analogue with a bimetallic hydride such as lithium aluminum hydride.

Another route to these compounds is by means of ω-ester alkylphenothiazinyl trifluoromethyl sulfones which have a reactive end group on the 10-alkyl chain, for example, an ω-tosylate or ω-chloro end group, which can be reacted with various amines to form primary or secondary amines, for instance by refluxing the ester and amine in the presence of an acid binder for short periods.

The primary 10-(aminoalkyl)-phenothiazinyl trifluoromethyl sulfones are alternatively produced by reacting a trifluoromethylsulfonylphenothiazine of Formula 4 with an excess of acrylonitrile or in an inert solvent such as benzene in the presence of a catalytic amount of strong base, such as a quaternary base, for instance benzyltrimethylammonium hydroxide. The resulting β-cyanoethyl compound is then reduced, for instance, with lithium aluminum hydride to give the primary amine. Further alkylation of the primary amine gives other compounds of this invention.

The foregoing is a general description of the main synthetic routes in the preparation of 10-(ω-aminoalkyl)-X-trifluoromethylsulfonylphenothiazine derivatives. It will be readily apparent to one skilled in the art that variations of these procedures are possible. Of particular advantage as preparative procedures are the methods thoroughly discussed above, especially, N-alkylation of 2-trifluoromethylsulfonylphenothiazine in the 10-position of the nucleus by a reactive dialkylaminoalkyl ester.

It will be readily apparent to one skilled in the art that certain of the compounds of this invention, notably those in which A is represented by an aliphatic carbon chain branched so that an asymmetric carbon atom is formed or where $R_3$ and $R_4$ are alkyl, may be present as optical or cistrans isomers. The connotation of the general formulae presented herein is to include all isomers, particularly the separated $d$ or $l$ optical isomers as well as the $dl$ mixture of these isomers. If desired, the isomers may be separated for individual use by separation methods known to the art, such as fractional crystallization, for instance, of the $d$-tartrate salts of the 10-aminoalkylated trifluoromethylsulfonylphenothiazine derivatives. Alternatively, a synthesis starting with an optically active side chain may yield the desired optical isomer.

The following examples are not limiting but are illustrative of compounds of this invention and the procedures for their preparation and will serve to make fully apparent all of the compounds embraced by the general formula given above and the preparation thereof respectively.

*Example 1*

A solution of 8.0 g. of chromic anhydride, 8.0 g. of sulfuric acid and 25 ml. of water is mixed with 15.4 g. of 3-nitro-4-chlorophenyl trifluoromethyl sulfide and the resulting mixture is stirred for 15 hours at 120–130° C. Steam distilling the reaction mixture yields 3-nitro-4-chlorophenyl trifluoromethyl sulfone.

A solution of 4.0 g. of sodium hydroxide pellets in 30 ml. of water is added to 18.9 g. of 2-bromothiophenol dissolved in 250 ml. of ethanol and the resulting mixture added to a solution of 28.9 g. of 3-nitro-4-chlorophenyl trifluoromethyl sulfone in 100 ml. of ethanol. The suspension is refluxed for three hours. The solid present is filtered from the hot reaction mixture and washed several times with hot ethanol. The combined alcoholic filtrate is diluted with a small amount of water and cooled to yield 2′-bromo-2-nitro-4-trifluoromethylsulfonyldiphenyl sulfide.

A solution of 225.7 g. of stannous chloride crystals in 750 ml. of concentrated hydrochloric acid is carefully mixed with 44.2 g. of 2′-bromo-2-nitro-4-trifluoromethylsulfonyldiphenyl sulfide. The mixture is stirred and refluxed for five hours. The cooled reaction mixture is filtered and the separated solid metal complex is broken up by hydrolysis for one hour at reflux with 10% caustic soda and washed with benzene. The organic layer is separated and combined with further benzene washes. The solvent is then removed by distillation in vacuo and upon purification of the residue, 2′-bromo-2-amino-4-trifluoromethylsulfonyldiphenyl sulfide is obtained.

A suspension of 20.6 g. of 2′-bromo-2-amino-4-trifluoromethylsulfonyldiphenyl sulfide, 8.3 g. of anhydrous potassium carbonate and 0.4 g. of copper-bronze powder in 200 ml. of dimethylformamide is stirred and heated at reflux for 18 hours. The cooled reaction mixture is filtered and the filtrate diluted with water. The solid which thus forms is vacuum sublimed at 0.05 mm. (175–195° C.) and recrystallized to give pure 2-trifluoromethylsulfonylphenothiazine.

*Example 2*

A suspension of 33.1 g. of 2-trifluoromethylsulfonylphenothiazine (prepared as in Example 1) and 2.4 g. of lithium amide in 100 ml. of dry toluene is stirred vigorously, slowly heated to reflux temperature and refluxed for two hours. A solution of 13.3 g. of 3-chloro-1-dimethylaminopropane in 10 ml. of toluene is then added slowly and the resulting mixture refluxed for four hours. After decomposing the excess lithium amide by the cautious addition of 10 ml. of water, the toluene layer is separated and water washed. The dried solvent is removed in vacuo and the residue chromatographed through alumina to give 10-(3′-dimethylaminopropyl)-2-trifluoromethylsulfonylphenothiazine.

A solution of 1.0 g. of the base in 25 ml. of dry ether is treated with ethereal hydrogen chloride yielding the hydrochloride salt.

*Example 3*

A suspension of 6.6 g. of 2-trifluoromethylsulfonylphenothiazine (made as in Example 1), 1.2 g. of potassium amide and 2.7 g. of 2-chloro-1-dimethylaminopropane in 100 ml. of toluene is heated at reflux for four hours. The reaction mixture is water-washed, extracted with dilute mineral acid and acidic extracts neutralized with aqueous ammonia. Upon benzene extraction, the residual basic oil is reacted with bismethylenesalicylic acid in ethyl acetate solution to give, after purification, 10-(dimethylaminoisopropyl) - 2-trifluoromethylsulfonylphenothiazine bismethylenesalicylate.

*Example 4*

A mixture of 16.5 g. of 2-trifluoromethylsulfonylphenothiazine (made as in Example 1), 2.4 g. of sodamide and 10.5 g. of 1-(3′-chloropropyl)-4-methylpiperazine in 200 ml. of xylene is stirred and refluxed for four hours. The reaction mixture is extracted with water and the separated xylene layer extracted portion-wise with dilute hydrochloric acid. The combined acid extracts are neutralized with ammonium hydroxide and the product taken up in benzene. Removal of the solvent and chromatography over alumina yields 10-[3'-(4''-methyl-1'''-piperazinyl)-propyl]-2-trifluoromethylsulfonylphenothiazine. Treating the oil with maleic acid in ethyl acetate results in the formation of the dimaleate salt.

*Example 5*

A suspension of 66.2 g. of 2-trifluoromethylsulfonylphenothiazine (made as in Example 1) and 8.2 g. of sodium amide in 900 ml. of toluene is heated at reflux with rapid stirring for 15 minutes. A solution of 41.8 g. of 1-formyl-4-(3'-chloropropyl)-piperazine in 100 ml. of toluene is added and refluxing continued for six hours. The cooled reaction mixture is treated with 150 ml. of water and toluene layer extracted with dilute hydrochloric acid. The acid extracts are made basic with ammonia and extracted with benzene. The solvent is distilled off in vacuo, leaving the residual 10-[3'-(N-formylpiperazinyl)-propyl]-2-trifluoromethylsulfonylphenothiazine as a viscous oil.

*Example 6*

A solution of 60.6 g. of 10-[3'-(N-formylpiperazinyl)-propyl]-2-trifluoromethylsulfonylphenothiazine (made as in Example 5) in 200 ml. of ethanol and 109 ml. of water containing 13 ml. of 40% sodium hydroxide solution is refluxed for two hours. The alcohol is removed by distillation in vacuo on the steam bath. The residue is treated with benzene-water and the dried organic layer evaporated in vacuo chromatographic separations of the residual oil gives 10-(3'-piperazinylpropyl)-2-trifluoromethylsulfonylphenothiazine. Upon reacting a solution of the base in ethyl acetate with maleic acid, the dimaleate salt is obtained.

*Example 7*

A stirred suspension of 22.8 g. of 10-(3'-piperazinylpropyl)-2-trifluoromethylsulfonylphenothiazine (prepared as in Example 6), 8.9 g. of β-bromoethyl acetate and 3.6 g. of potassium carbonate in 200 ml. of toluene is refluxed for 16 hours. The cooled reaction mixture is treated with water and the separated organic layer extracted with dilute acid. The combined acid extract is neutralized, further extracted with benzene and upon evaporation of the solvent in vacuo, an oily residue is obtained which is purified by chromatography through alumina. A solution of the free base in ether is treated with ethereal hydrogen chloride to give 10-[3'-(N-acetoxyethylpiperazinyl)-propyl]-2-trifluoromethylsulfonylphenothiazine dihydrochloride.

*Example 8*

A solution of 2.2 g. of 10-[3'-(N-acetoxyethylpiperazinyl)-propyl]-2-trifluoromethylsulfonylphenothiazine (prepared as in Example 7) in 50 ml. of 1 N hydrochloric acid is refluxed for a short time. The reaction mixture is neutralized with dilute sodium carbonate solution and extracted with benzene. Evaporation of the solvent gives 10-[3'-(N-β-hydroxyethylpiperazinyl)-propyl]-2-trifluoromethylsulfonylphenothiazine as an oil.

*Example 9*

To a solution of 5.0 g. of 10-[3'-(N-β-hydroxyethylpiperazinyl)-propyl]-2-trifluoromethylsulfonylphenothiazine (prepared as in Example 8) in 25.0 g. of pyridine, 1.5 g. of benzoyl chloride is added with swirling. The reaction mixture is allowed to stand for eight hours and then poured into a large volume of water. The precipitate is filtered, water-washed, redissolved in ether and treated with ethereal hydrogen chloride to give the dihydrochloride salt of 10-[3'-(N-benzoyloxyethylpiperazinyl)-propyl]-2-trifluoromethylsulfonylphenothiazine.

*Example 10*

To a solution of 4.6 g. of 10-(3'-piperazinylpropyl)-2-trifluoromethylsulfonylphenothiazine (made as in Example 6) in 150.0 g. of benzene, 1.8 g. of phenylacetyl chloride is added dropwise with swirling. The mixture, after standing overnight, is filtered to give crystals of 10-[3'-(N-phenylacetylpiperazinyl) - propyl]-2-trifluoromethylsulfonylphenothiazine hydrochloride.

*Example 11*

A suspension of 9.2 g. of 10-(3'-piperazinylpropyl)-2-trifluoromethylsulfonylphenothiazine, 5.6 g. of 4-bromo-4'-hydroxybutyl ether (prepared by carefully treating 4,4'-dihydroxybutyl ether with one equivalent of hydrobromic acid) and 4.2 g. of potassium carbonate in 200 ml. of xylene is heated at reflux for 24 hours. After treating the reaction mixture with water, the separated organic layer is extracted with acid. The acidic extracts are made basic and extracted with benzene. Removal of the solvent from the dried extracts yields 10-[3'-(N-hydroxybutoxybutylpiperazinyl)-propyl]-2- trifluoromethylsulfonylphenothiazine.

*Example 12*

A stirred suspension of 16.5 g. of 2-trifluoromethylsulfonylphenothiazine and 3.9 g. of sodamide in 150 ml. of xylene is refluxed while 13.6 g. of 3-bromo-1-pyrrolidinylpropane hydrobromide is added portion-wise. After the addition is complete, stirring and heating is continued for 15 hours. The cooled reaction mixture is carefully treated with ice water. The separated organic layer combined with several benzene washes is extracted with dilute hydrochloric acid. The acid extracts are neutralized with sodium hydroxide solution and then ether extracted. Evaporation of the ether gives 10-(3'-N-pyrrolidinylpropyl) - 2 - trifluoromethylsulfonylphenothiazine.

A solution of the base in ether is treated with glacial acetic acid to give the acetate salt.

*Example 13*

A mixture of 9.2 g. of 10-(3'-piperazinylpropyl)-2-trifluoromethylsulfonylphenothiazine, 1.8 g. of crotyl chloride and 1.6 g. of potassium carbonate in 100 ml. of aqueous ethanol is stirred and heated at reflux for six hours. The reaction mixture is worked up as outlined in Example 7 to give 10-[3'-(N-crotylpiperazinyl)-propyl]-2-trifluoromethylsulfonylphenothiazine.

Similarly, using cinnamyl chloride as described above, 10-[3'-(N-cinnamylpiperazinyl) - propyl] - 2 - trifluoromethylsulfonylphenothiazine is obtained.

*Example 14*

A suspension of 33.1 g. of 2-trifluoromethylsulfonylphenothiazine (prepared as in Example 1) and 2.4 g. of lithium amide in 100 ml. of dry toluene is refluxed for two hours. A solution of 14.9 g. of 2-chloro-1-diethylaminoethane in 25 ml. of toluene is added slowly and the resulting mixture refluxed for four hours. The excess lithium amide is decomposed by the addition of 20 ml. of water. The toluene layer is separated and washed with water. The dried solvent is removed in vacuo to yield crude 10 - (2' - diethylaminoethyl) - 2-trifluoromethylsulfonylphenothiazine.

A solution of 1.0 g. of the base in 25 ml. of dry ether is treated with excess ethereal hydrogen chloride to give the hydrochloride salt.

*Example 15*

A suspension of 16.5 g. of 2-trifluoromethylsulfonylphenothiazine (prepared as in Example 1), 16.2 g. of N-carbobenzoxy-N'-(α - chloro - β - methylpropyl)-piperazine (prepared from the reaction of N-carbobenzoxy-piperazine with 3-bromo-2-methylpropyl chloride) and 2.2 g. of sodamide in 250 ml. of toluene is refluxed for four hours. The reaction mixture is treated with water and the organic layer is separated and washed with water. The dried solvent is removed in vacuo to yield 10-[3'-(N-carbobenzoxypiperazinyl)-2'-methylpropyl] - 2 - trifluoromethylsulfonylphenothiazine.

A solution of 18.0 g. of 10-[3'-(N-carbobenzoxypiperazinyl)-2' - methylpropyl] - 2 - trifluoromethylsulfonylphenothiazine in 200 ml. of aqueous ethanol and 10 ml. of 40% sodium hydroxide solution is refluxed for four hours. After removal of the alcohol in vacuo, the residue is treated with benzene and water. The dried benzene layer is evaporated to give the product 10-(2'-methyl-3'-piperazinylpropyl) - 2 - trifluoromethylsulfonylphenothiazine.

A solution of the free base (1.0 g.) in ethyl acetate is treated with a solution of mandelic acid in ethanol. Concentration and cooling of the resulting solution yields the dimandelate salt.

*Example 16*

A mixture of 14.1 g. of 10-(2'-methyl-3'-piperazinylpropyl)-2-trifluoromethylsulfonylphenothiazine (prepared as in Example 15) and 60 ml. of 85% formic acid solution is warmed to 50° C., after which 20 ml. of 37% formalin solution is added slowly. The temperature of the reaction mixture is maintained at 50 to 60° C. until there is no further evolution of carbon monoxide. The mixture is neutralized with dilute sodium hydroxide solution and extracted with benzene. Removal of the dried solvent and vacuum distillation of the residue gives 10-[3'-(4''-methyl-1''-piperazinyl)-2'-methylpropyl] - 2 - trifluoromethylsulfonylphenothiazine.

A solution of 1.0 g. of the free base in 25 ml. of dry ether is treated with an excess of ethereal hydrogen chloride to give the dihydrochloride salt.

*Example 17*

To a stirred suspension of 19.2 g. of 10-(2'-cyanoethyl) - 2 - trifluoromethylsulfonylphenothiazine (prepared from the reaction of 2 - trifluoromethylsulfonylphenothiazine, which is prepared as in Example 1, and acrylonitrile with benzyltrimethylammonium hydroxide) in 700 ml. of dry ether, a solution of 8.0 g. of lithium aluminum hydride in 250 ml. of ether is added slowly. The mixture is refluxed for eight hours, cooled and treated with methanol to destroy the metal complex. After filtration, the filtrate is evaporated and the residue extracted several times with dilute hydrochloric acid. The acidic extracts are neutralized and extracted with chloroform. Evaporation of the solvent yields 10-(3'-aminopropyl)-2-trifluoromethylsulfonylphenothiazine.

*Example 18*

A mixture of 16.3 g. of 10-(3'-hydroxypropyl)-2-trifluoromethylsulfonylphenothiazine p-toluene sulfonate (prepared by condensing the sodio derivative of 2-trifluoromethylsulfonylphenothiazine with γ-bromopropyltetrahydropyranyl ether, hydrolyzing the protective pyranyl group with hydrochloric acid and acylating the resulting γ-hydroxy compound with excess p-toluenesulfonyl chloride in pyridine) and 9.0 g. of butylamine in 75 ml. of ethanol is refluxed for ten hours. The reaction mixture is evaporated on the steam bath and the residue extracted with a water-chloroform mixture. The organic layer is separated and extracted with dilute hydrochloric acid. The acid extracts are neutralized with sodium carbonate solution and extracted with ethyl acetate. Treating the ethyl acetate solution with maleic acid results in the formation of 10-(3'-butylaminopropyl)-2-trifluoromethylsulfonylphenothiazine maleate.

*Example 19*

A suspension of 33.1 g. of 2-trifluoromethylsulfonylphenothiazine (prepared as in Example 1) and 2.4 g. of lithium amide in 125 ml. of xylene is mixed slowly with a solution of 22.7 g. of 3-bromo-1-piperidylpropane in 100 ml. of xylene at 100° C. The mixture is then refluxed for four hours, cooled and treated with water. The organic layer is extracted with acid and the acid extracts are neutralized with ammonium hydroxide solution. The resulting solution is extracted with benzene; the solvent is then removed by distillation in vacuo to give the product, 10-(3'-N-piperidylpropyl)-2-trifluoromethylsulfonylphenothiazine.

*Example 20*

A suspension of 6.6 g. of 2-trifluoromethylsulfonylphenothiazine (prepared as in Example 1), 0.8 g. of sodamide and 5.1 g. of 3-chloro-1-(1',2',3',5',6'-pentamethylpiperazinyl)-propane in 150 ml. of toluene is refluxed for four hours. The reaction mixture is treated with water and the organic layer extracted several times with dilute hydrochloric acid. The acid extracts are neutralized with ammonium hydroxide solution and extracted with benzene. The solvent is removed yielding the product, 10-[3'-(1'',2'',3'',5'',6''-pentamethylpiperazinyl)-propyl] - 2 - trifluoromethylsulfonylphenothiazine.

By treating 1.0 g. of the free base with excess maleic acid in ethyl acetate solution, the dimaleate salt is obtained.

*Example 21*

A mixture of 6.6 g. of 2-trifluoromethylsulfonylphenothiazine (made as in Example 1), 0.8 g. of sodamide and 5.1 g. of 3-chloro-1-(1'-methyl-2',5'-diethylpiperazinyl)-propane in 250 ml. of toluene is refluxed for four hours. Working up the mixture as described in Example 20 yields the product, 10-[3'-(1''-methyl-2'',5''-diethylpiperazinyl)-propyl]-2-trifluoromethylsulfonylphenothiazine.

*Example 22*

A mixture of 19.4 g. of 10-(3'-aminopropyl)-2-trifluoromethylsulfonylphenothiazine (made as in Example 17) and 10.9 g. of butyl bis-(β-chloroethyl)-amine in 150 ml. of butanol is refluxed for nine hours. Tributylamine (20 ml.) is added and the refluxing continued for eight hours. The reaction mixture is concentrated by heating on the steam bath under reduced pressure, diluted with water and extracted with chloroform. The extracts are evaporated to yield the residue, 10-[3'-(4''-butyl-1''-piperazinyl) - propyl]-2-trifluoromethylsulfonylphenothiazine.

A solution of the free base (1.0 g.) in 50 ml. of acetone is reacted with an excess of citric acid in acetone to give the dicitrate salt.

*Example 23*

A suspension of 9.1 g. of 10-(3'-piperazinylpropyl)-2-trifluoromethylsulfonylphenothiazine (made as in Example 6), 0.8 g. of sodium amide and 3.3 g. of 2-bromo-1-dimethylaminoethane in 125 ml. of benzene is refluxed for six hours, with stirring. Treating the reaction mixture as in Example 20 gives the product, 10-[3'-(N-β-dimethylaminoethylpiperazinyl) - propyl]-2-trifluoromethylsulfonylphenothiazine.

*Example 24*

A stirred suspension of 9.1 g. of 10-(3'-piperazinylpropyl)-2-trifluoromethylsulfonylphenothiazine (made as in Example 6), 3.4 g. of ω-bromobutanol and 4.0 g. of potassium carbonate in 125 ml. of xylene is refluxed for six hours. Water is added to the reaction mixture and the separated xylene layer is extracted with dilute hydrochloric acid. The acid extracts are neutralized and extracted with benzene. The solvent is distilled in vacuo to give a residue of 10 - [3' - (N-ω-hydroxybutylpiperazinyl)-propyl]-2-trifluoromethylsulfonylphenothiazine.

A mixture of 5.3 g. of the free base in 100 ml. of benzene and 3.6 g. of butyryl chloride is allowed to stand at room temperature for 12 hours. The reaction mixture is poured into water, neutralized and extracted with benzene. The residue upon evaporation of solvent is the crude product, 10-[3'-(N-ω-butyryloxybutylpiperazinyl)-propyl]-2-trifluoromethylsulfonylphenothiazine.

*Example 25*

A mixture of 10.8 g. of 10-(3'-hydroxypropyl)-2-trifluoromethylsulfonylphenothiazine p - toluenesulfonate (prepared as outlined in Example 18), 5.0 g. of N-hydroxyethoxyethylpiperazine and 4.2 g. of potassium carbonate in 150 ml. of ethanol is heated at reflux for six hours, with stirring. The reaction mixture is treated with water, evaporated in vacuo and extracted with ethyl acetate. Evaporation of the dried solvent yields the product, 10 - [3' - (N - hydroxyethoxyethylpiperazinyl)-propyl]-2-trifluoromethylsulfonylphenothiazine.

*Example 26*

A suspension of 33.1 g. of 2-trifluoromethylsulfonylphenothiazine (prepared as in Example 1), 4.1 g. of sodamide and 29.3 g. of 3-chloro-1-(N-phenethylpiperazinyl)-propane in 500 ml. of toluene is refluxed for eight hours. Working up as in Example 20, the dimaleate salt of 10 - [3' - (N-phenethylpiperazinyl)-propyl]-2-trifluoromethylsulfonylphenothiazine is obtained.

*Example 27*

To a stirred mixture of 9.1 g. of 10-(3'-piperazinylpropyl)-2-trifluoromethylsulfonylphenothiazine (made as in Example 6), dissolved in 500 ml. of benzene and 10 ml. of pyridine is added 6.0 g. of acetic anhydride. The resulting mixture is allowed to stand for 16 hours, washed with water and evaporated to dryness. The residue is dissolved in alcohol and reacted with one equivalent of hydrochloric acid to give 10-[3'-(N-acetylpiperazinyl)-propyl] - 2 - trifluoromethylsulfonylphenothiazine hydrochloride.

*Example 28*

A mixture of 9.1 g. of 10-(3'-piperazinylpropyl)-2-trifluoromethylsulfonylphenothiazine (made as in Example 6) and 9.4 g. of benzoyl chloride in 300 ml. of benzene is refluxed for eight hours. Concentration of the reaction mixture yields 10-[3'-(N-benzoylpiperazinyl)-propyl]-2-trifluoromethylsulfonylphenothiazine hydrochloride.

*Example 29*

A suspension of 6.6 g. of 2-trifluoromethylsulfonylphenothiazine (made as in Example 1), 0.8 g. of sodamide and 5.7 g. of N-diethylcarbamyl-N'(γ-chloropropyl)-piperazine in 100 ml. of xylene is refluxed for eight hours. Following the procedure of Example 20, the reaction mixture is worked up to yield 10-[3'-(N-diethylcarbamylpiperazinyl) - propyl] - 2 - trifluoromethylsulfonylphenothiazine.

This application is a division of application Serial No. 728,773, filed April 16, 1958, which is a continuation-in-part of application Serial No. 664,463, filed June 10, 1957.

What is claimed is:
1. Chemical compounds having the formula:

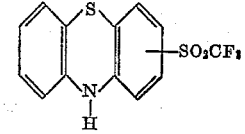

2. A chemical compound having the formula:

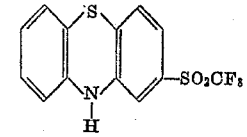

No references cited.